(12) United States Patent
Fujimoto

(10) Patent No.: US 11,307,041 B2
(45) Date of Patent: Apr. 19, 2022

(54) VEHICLE INFORMATION PROVIDING DEVICE, VEHICLE INFORMATION PROVIDING METHOD, AND PROGRAM

(71) Applicant: HONDA MOTOR CO., LTD., Tokyo (JP)

(72) Inventor: Naotoshi Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 16/624,995

(22) PCT Filed: Jun. 29, 2018

(86) PCT No.: PCT/JP2018/024968
§ 371 (c)(1),
(2) Date: Dec. 20, 2019

(87) PCT Pub. No.: WO2019/004475
PCT Pub. Date: Jan. 3, 2019

(65) Prior Publication Data
US 2020/0149902 A1    May 14, 2020

(30) Foreign Application Priority Data
Jun. 29, 2017   (JP) .............................. JP2017-127817

(51) Int. Cl.
*G01C 21/34*     (2006.01)
*G01C 21/36*     (2006.01)
(Continued)

(52) U.S. Cl.
CPC ..... *G01C 21/3415* (2013.01); *G01C 21/3605* (2013.01); *G06Q 10/047* (2013.01); *G06Q 20/0855* (2013.01); *G06Q 30/0239* (2013.01); *G06Q 50/30* (2013.01); *G05D 1/0212* (2013.01); *G06Q 2240/00* (2013.01)

(58) Field of Classification Search
CPC ............ G01C 21/3415; G01C 21/3605; G06Q 10/047; G06Q 20/0855; G06Q 30/0239; G06Q 50/30; G06Q 2240/00; G05D 1/0212
See application file for complete search history.

(56) References Cited

FOREIGN PATENT DOCUMENTS

| JP | 2002-334139 | 11/2002 |
|---|---|---|
| JP | 2013-182597 | 9/2013 |
| JP | 2016-194854 | 11/2016 |

OTHER PUBLICATIONS

International Search Report and Written Opinion for International Application Serial No. PCT/JP2018/024968 dated Sep. 11, 2018, 5 pages.

*Primary Examiner* — Michael D Lang
(74) *Attorney, Agent, or Firm* — Amin, Turocy & Watson, LLP

(57) ABSTRACT

A vehicle information providing device (300) includes an acquisition unit (320) that acquires a destination input by a user and a plan setting unit (330) that sets a plan for a vehicle to travel toward the destination acquired by the acquisition unit, and the plan setting unit (330) sets a first travel plan for moving a first user to a first destination set as a destination on a first route and sets a second travel plan for moving the first user and a second user in a second route which allows the second user to ride by changing the first route in a case in which the second user also rides in the vehicle traveling in accordance with the first travel plan.

12 Claims, 14 Drawing Sheets

(51) Int. Cl.
*G06Q 10/04* (2012.01)
*G06Q 20/08* (2012.01)
*G06Q 30/02* (2012.01)
*G06Q 50/30* (2012.01)
*G05D 1/02* (2020.01)

| VEHICLE ID | ALLOCATION FLAG | CURRENT PLACE | DEPARTURE PLACE | TRANSIT POINT | DESTINATION | NUMBER OF VACANT SEATS | DEPARTURE TIME | ARRIVAL TIME |
|---|---|---|---|---|---|---|---|---|
| 000a | 1 | (,,) | (,,) | (,,) | (,,) | 3 | 2017///: | 2017///: |
| 000b | 0 | (,,) | (,,) | (,,) | (,,) | 4 | — | — |
| ... | ... | ... | ... | ... | ... | ... | ... | ... |

FIG. 10
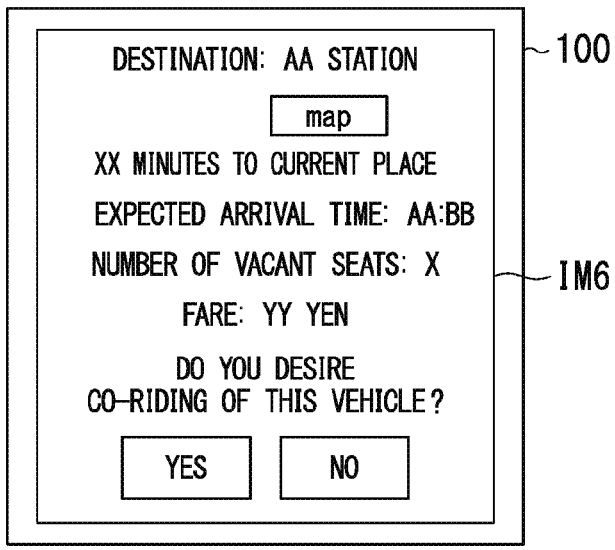
FIG. 11
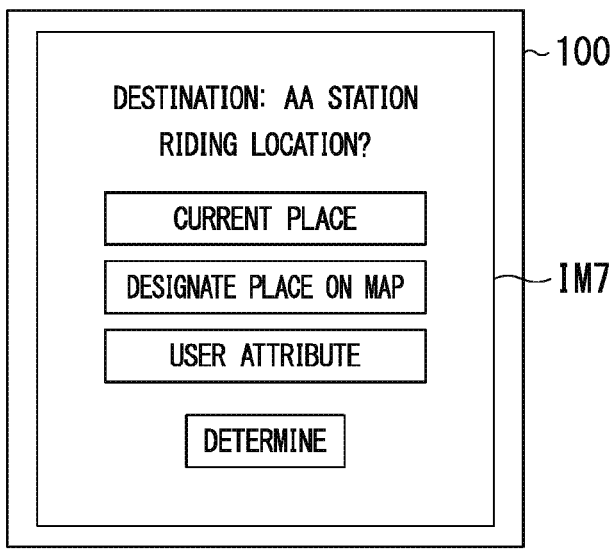
FIG. 12
101
| USER ID | DESIRED RIDING VEHICLE ID | CURRENT PLACE | DESIRED RIDING LOCATION |
|---|---|---|---|
| 000* | 00 | (, ) | (, **) |

VEHICLE INFORMATION PROVIDING DEVICE, VEHICLE INFORMATION PROVIDING METHOD, AND PROGRAM

TECHNICAL FIELD

The present invention relates to a vehicle information providing device, a vehicle information providing method, and a program.

Priority is claimed on Japanese Patent Application No. 2017-127817, filed Jun. 29, 2017, the content of which is incorporated herein by reference.

BACKGROUND ART

There are technologies for assisting ride-sharing by allowing a co-passenger to ride in a vehicle on the way to a destination of the vehicle (for example, Patent Document 1).

CITATION LIST

Patent Document

[Patent Document 1]
Japanese Patent Application, Publication No. 2016-194854

SUMMARY OF INVENTION

Technical Problem

In inventions described in the conventional document, changing the route of a vehicle in order to allow a co-passenger to ride in the vehicle may not be taken into account.

One object of an aspect of the present invention is to provide a vehicle information providing device, a vehicle information providing method, and a program capable of changing a route of a vehicle in accordance with the circumstances of a co-passenger.

Solution to Problem (1): According to one aspect, there is provided a vehicle information providing device including: an acquisition unit that acquires a destination input by a user; and a plan setting unit that sets a plan for a vehicle to travel toward the destination acquired by the acquisition unit, and the plan setting unit sets a first travel plan for moving a first user to a first destination set as a destination on a first route and sets a second travel plan for moving the first user and a second user on a second route which allows the second user to ride by changing the first route in a case in which the second user also rides in the vehicle traveling in accordance with the first travel plan.

(2): In the vehicle information providing device described in (1), the first travel plan will allow the first user to move to the first destination before a first time, and, in a case in which the second user desires to ride therewith, the plan setting unit may determine whether or not the first user will be able to be moved to the first destination before the first time in a case in which the vehicle travels in accordance with the second travel plan and sets the second travel plan to the travel plan instead of the first travel plan in a case in which it is determined that the first user will be able to be moved to the first destination before the first time in a case in which the vehicle travels in accordance with the second travel plan.

(3): The vehicle information providing device described in (2) may further include a communicator that communicates with a plurality of terminal devices, and the plan setting unit may cause the communicator to transmit information for inquiring about whether or not permission for co-riding of the second user is accepted to a terminal device used by the first user at the time of setting the second travel plan to the travel plan and set the second travel plan to the travel plan instead of the first travel plan in a case in which the communicator receives information indicating that the first user permits co-riding of the second user.

(4): In the vehicle information providing device described in (2) or (3), the plan setting unit sets a fare for the user and discounts a fare for the first user who has permitted co-riding of the second user by a first discount amount.

(5): The vehicle information providing device described in any one of (2) to (4), further including a communicator that communicates with a plurality of terminal devices, and, in a case in which the second user desires co-riding, the plan setting unit determines whether or not the first user will be able to be moved to the first destination before the first time in a case in which the vehicle travels in accordance with the second travel plan and causes the communicator to transmit information for inquiring about whether or not permission for co-riding of the second user is accepted to the terminal device used by the first user in a case in which it is determined that the first user cannot be moved to the first destination before the first time in a case in which the vehicle travels in accordance with the second travel plan and sets the second travel plan to the travel plan instead of the first travel plan in a case in which the communicator receives information indicating that the first user permits co-riding of the second user.

(6): In the vehicle information providing device described in (5), the plan setting unit sets a fare for the user and discounts a fare for the first user who has permitted co-riding of the second user by a second discount amount that is a discount amount larger than a first discount amount that is the discount amount in a case in which the vehicle arrives at the destination before the first time in a case in which it is determined that the first user cannot be moved to the first destination before the first time in a case in which the vehicle travels in accordance with the second travel plan, and the communicator receives information indicating that the first user permits co-riding of the second user.

(7): There is provided a vehicle information providing method using a computer, the vehicle information providing method including: acquiring a destination input by a user; setting a plan for a vehicle to travel toward the acquired destination; setting a first travel plan for moving a first user to a first destination set as a destination on a first route; and setting a second travel plan for moving the first user and a second user in a second route which allows the second user to ride by changing the first route in a case in which the second user also rides in the vehicle traveling in accordance with the first travel plan.

(8): There is provided a program causing a computer to execute: acquiring a destination input by a user; setting a plan for a vehicle to travel toward the acquired destination; setting a first travel plan for moving a first user to a first destination set as a destination on a first route; and setting a second travel plan for moving the first user and a second user in a second route which allows the second user to ride by changing the first route in a case in which the second user also rides in the vehicle traveling in accordance with the first travel plan.

Advantageous Effects of Invention

According to (1), (7), and (8), the route of a vehicle can be changed in accordance with circumstances of a co-passenger.

According to (2), a route in which a co-passenger is allowed to ride in the vehicle can be set without a schedule of a user, who is already riding in the vehicle, being influenced.

According to (3) and (5), an approval for a disadvantage to a user who is already riding in the vehicle such as a change of an arrival time or the like can be acquired in advance.

According to (4) and (6), by giving an incentive to a user who is already riding in the vehicle, the riding of co-passengers in the vehicle can be promoted.

BRIEF DESCRIPTION OF DRAWINGS

FIG. 5 is a diagram showing one example of details of vehicle operation information.

FIG. 10 is a diagram showing one example of an image representing information of vehicles moving toward the same destination.

FIG. 11 is a diagram showing one example of an image for inputting information displayed in a terminal device.

FIG. 12 is a diagram showing one example of details of co-passenger information.

DESCRIPTION OF EMBODIMENTS

Hereinafter, a vehicle information providing system, a vehicle information providing method, and a program according to embodiments of the present invention will be described with reference to the drawings. The vehicle information providing system is a device that is used for assisting sharing one or more vehicles by a plurality of users (ride sharing). For example, a vehicle that is used for ride sharing may be an automated driving vehicle that basically does not require a drive operation. Hereinafter, although an automated driving vehicle will be described as being used for ride sharing, a manual driving vehicle may be used.

When a destination input from a terminal device of a user is acquired through communication, the vehicle information providing system searches for vehicles traveling toward a destination (vehicles that can be allocated). Furthermore, the vehicle information providing system causes a vehicle to travel such that a plurality of other users desiring to move toward a destination of a vehicle used by a user can ride together. In communication, both data communication and speech communication, in other words, a telephone call may be included.

[Entire Configuration]

Figure 1:
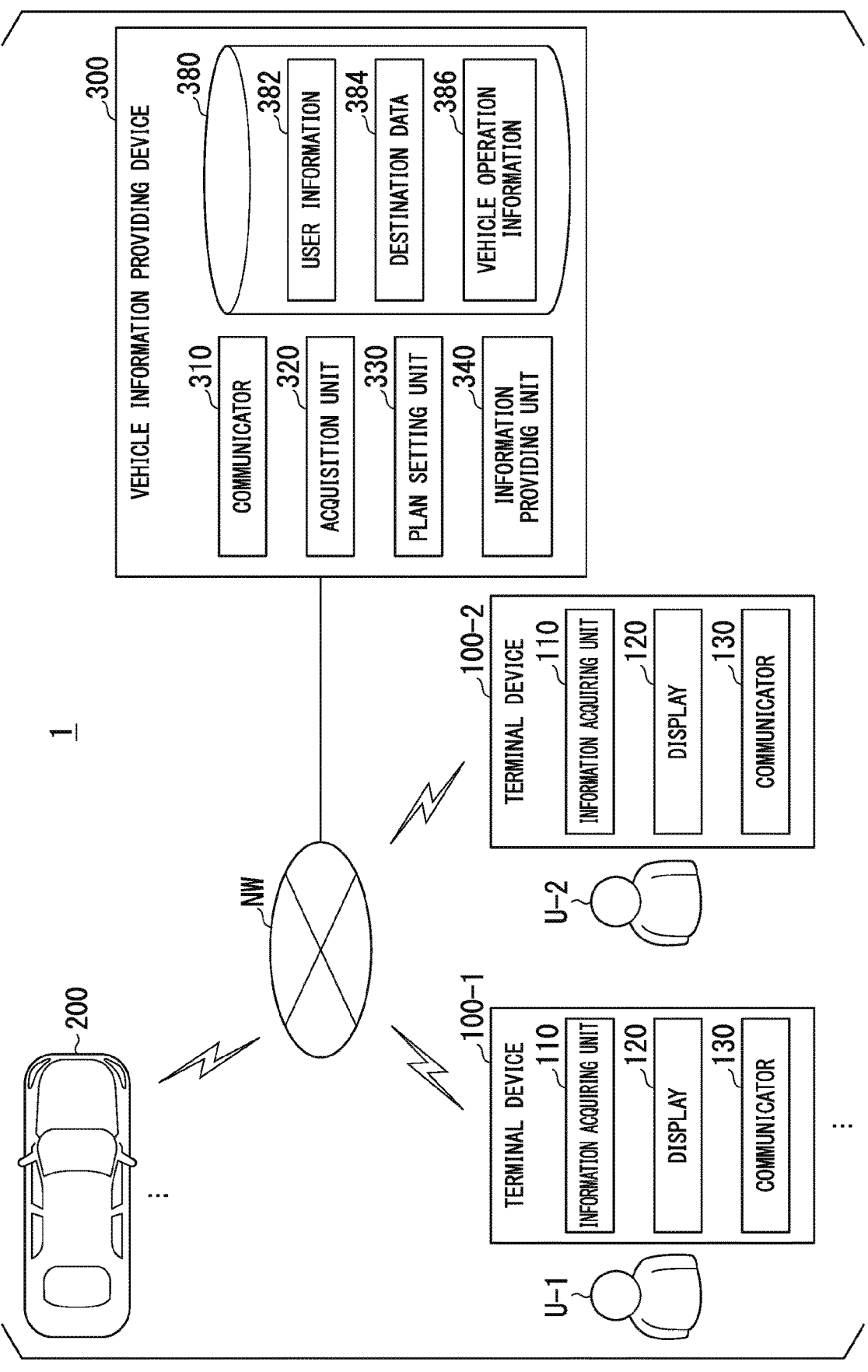
FIG. 1 is a configuration diagram of a vehicle information providing system.

FIG. 1 is a configuration diagram of a vehicle information providing system 1. The vehicle information providing system 1 includes a plurality of terminal devices 100-1, 100-2, . . . respectively used by a plurality of users U-1, U-2, . . . , one or more vehicles 200, and a vehicle information providing device 300. In the following description, a number following a hyphen identifies a user and may be appropriately omitted.

Such constituent elements can communicate with each other through a network NW. The network NW includes the Internet, a wide area network (WAN), a local area network (LAN), a public line, a provider device, a dedicated line, a radio base station, and the like. In addition, "being used by a user U" may include a terminal device 100 used by a plurality of unspecified persons such as a terminal device of an Internet café or the like being temporarily used by a user U. Furthermore, it is assumed that a user U performs user registration such that the user is managed using an ID identifying the user U for using the following service.

[Terminal Device]

The terminal device 100 is, for example, a smartphone, a tablet terminal, a personal computer, or the like. The terminal device 100 supports a service to be described below by operating an application program, a browser, or the like used for using a ride sharing system. In the following description, it is premised that the terminal device 100 is a smartphone, and an application program (a ride sharing application) is operated. In addition, the ride sharing program may be operated using an AI function by recognizing speech, a gesture, or the like of a user.

The ride sharing application transmits a destination of a user U to the vehicle information providing device 300 or performs a push notification based on information received from the vehicle information providing device 300 by communicating with the vehicle information providing device 300 in accordance with an operation of the user U. For example, the terminal device 100 includes an information acquiring unit 110, a display 120, and a communicator 130. Operations of each functional unit will be described later. The display 120, for example, is a touch panel and, as will be described later, displays an input screen in a case in which the ride sharing application is operated and accepts an input of a destination from a user.

In addition, as described above, an input of a destination may be accepted using an AI function by recognizing speech, a gesture, or the like of a user.

[Vehicle]

Figure 2:
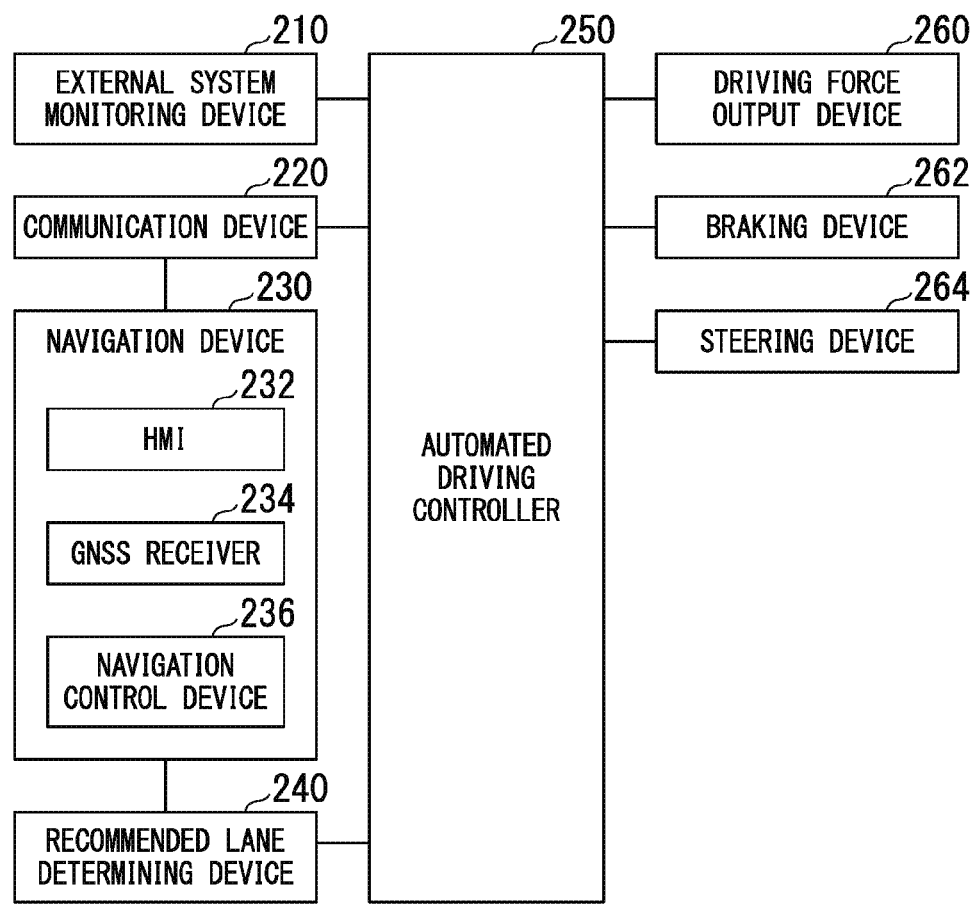
FIG. 2 is a configuration diagram of a vehicle.

The vehicle 200, for example, is a vehicle having four or more vehicle wheels in which a plurality of users U can ride and may be an automated two-wheel vehicle or any other vehicle. FIG. 2 is a configuration diagram of the vehicle 200. The vehicle 200, for example, includes an external system monitoring device 210, a communication device 220, a navigation device 230, a recommended lane determining device 240, an automated driving controller 250, a driving force output device 260, a braking device 262, and a steering device 264.

The external system monitoring device 210, for example, includes an object recognizing device performing a sensor fusion process on the basis of outputs of cameras, radars, and a light detection and ranging (LIDAR) device and the like. The external system monitoring device 210 determines types of object (particularly, a vehicle, a pedestrian, and a bicycle) present in the vicinity of the vehicle 200 and outputs the estimated types to the automated driving controller 250 together with information of positions and speeds thereof.

As will be described later, in a case in which a user U performs a predetermined gesture on a traveling route, the external system monitoring device 210 authenticates the user U who has performed the gesture and outputs the user to the automated driving controller 250. In addition, the external system monitoring device 210 may authenticate a face of the user U, a barcode displayed in the terminal device 100, or the like.

The communication device 220, for example, is a radio communication module for connection to the network NW or direct communication with another vehicle, a terminal device of a pedestrian, and the like. The communication device 220 performs radio communication on the basis of Wi-Fi, dedicated short range communications (DSRC), Bluetooth (registered trademark), or any other communication standard. A plurality of communication devices 220 according to uses may be provided.

For example, the navigation device 230 includes a human machine interface (HMI) 232, a global navigation satellite system (GNSS) receiver 234, and a navigation control device 236. The HMI 232, for example, includes a touch panel-type display device, a speaker, a microphone, and the like. The GNSS receiver 234 determines the location of the receiver (the location of the vehicle 200) on the basis of radiowaves arriving from GNSS satellites (for example, GPS satellites). The navigation control device 236, for example, includes a central processing unit (CPU) and various storage devices and controls the overall operation of the navigation device 230. Map information (a navigation map) is stored in the storage devices.

The navigation map is a map that represents roads using nodes and links. The navigation control device 236 determines a route from the location of the vehicle 200 determined by the GNSS receiver 234 to a destination designated using the HMI 232 by referring to the navigation map. In addition, the navigation control device 236 may transmit the location of the vehicle 200 and the destination to a navigation server (not shown in the drawing) using the communication device 220 and acquire a route returned from the navigation server.

In addition, in the case of this example, information relating to a route to the destination may be designated or changed by the vehicle information providing device 300. The information relating to the route may include information of a transit point, a point at which the vehicle will stop to allow the user U to board or alight, and an arrival target time. The navigation control device 236 outputs the information of the route determined using one of the methods described above to the recommended lane determining device 240.

The recommended lane determining device 240, for example, includes a map positioning unit (MPU) and various storage devices. High-accuracy map information having a higher accuracy than that of the navigation map is stored in the storage devices. In the high-accuracy map information, for example, information of a road width, a gradient, a radius of curvature, a position of traffic lights, and the like for each lane is included. The recommended lane determining device 240 determines a recommended lane desired for traveling along a route input from the navigation device 230, generates information of a route, a recommended lane, and a traveling time, and outputs the generated information to the automated driving controller 250.

The automated driving controller 250 includes one or more processors such as CPUs, micro processing units (MPUs), or the like and various storage devices. The automated driving controller 250 causes automated travel of the vehicle 200 such that contact with objects of which the position and the speed have been input from the external system monitoring device 210 is avoided with traveling in a recommended lane determined by the recommended lane determining device 240 set as a principle.

The automated driving controller 250, for example, sequentially executes various events. Regarding these events, there are a constant-speed traveling event in which the vehicle travels at a constant speed in the same traveling lane, a following traveling event in which the vehicle travels behind a preceding vehicle, a lane changing event, a merging event, a branching event, an emergency stopping event, a tollgate event for passing through a tollgate, a handover event for ending automated driving and switching to manual driving, and the like. In addition, during the execution of such an event, there are also cases in which an action for avoidance is planned on the basis of a surrounding situation (the presence of surrounding vehicles and pedestrians, lane narrowing due to roadwork, and the like) of the vehicle 200.

The automated driving controller 250 generates a target locus along which the vehicle 200 will travel in the future. The target locus, for example, includes a speed element. For example, the target locus is represented by sequentially aligning points (locus points) at which the vehicle 200 will arrive. A locus point is a point at which the vehicle 200 will arrive for respective predetermined traveling distances and, in addition thereto, a target speed and a target acceleration for every predetermined sampling time (for example, every several tenths of a [sec]) may be generated as a part of the target locus.

In addition, the locus point may be a position at which the vehicle 200 will arrive at a sampling time for every predetermined sampling time. In such a case, information of a target speed and a target acceleration is represented as intervals between the locus points.

Figure 3:
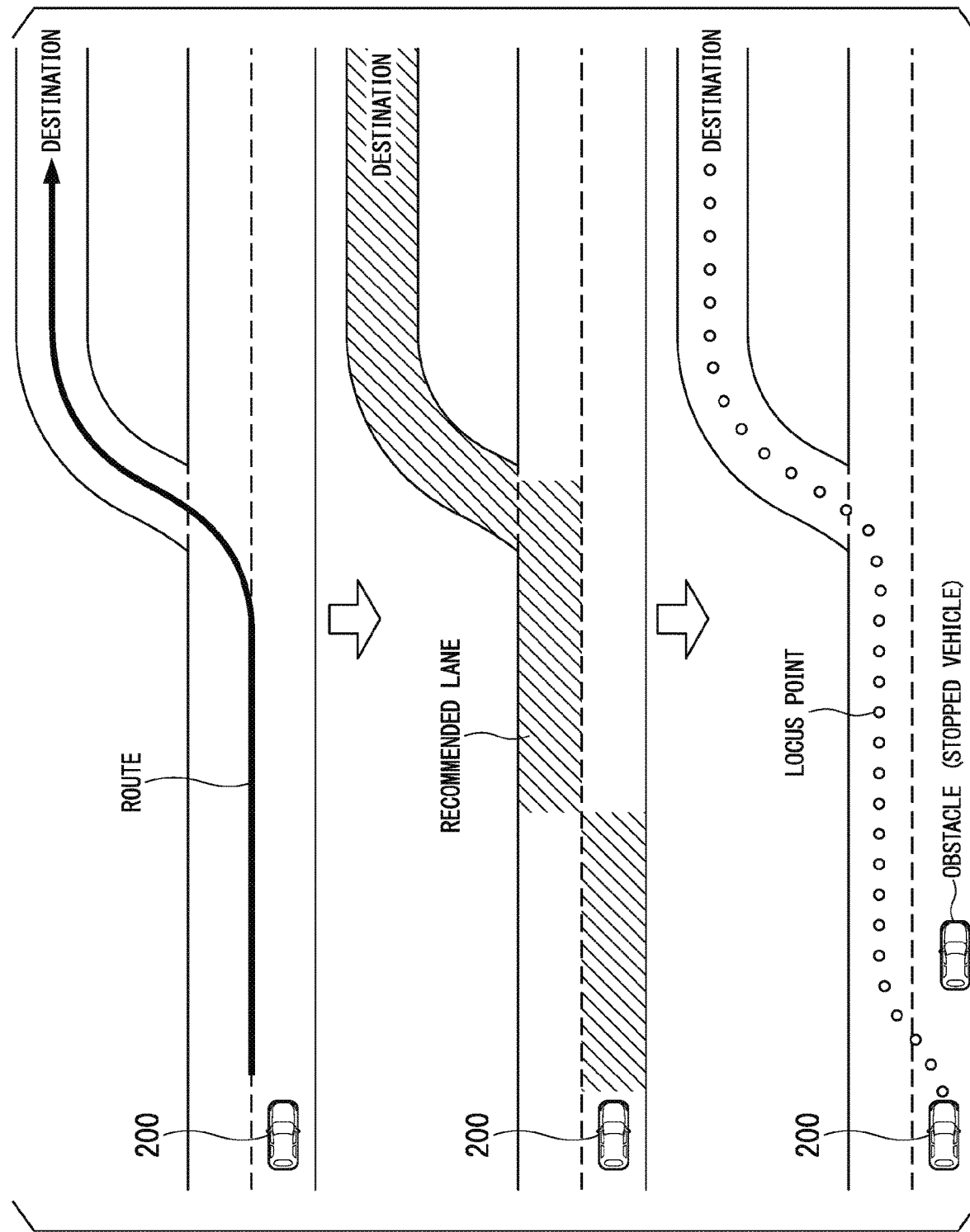
FIG. 3 is a diagram showing a processing procedure of automated driving.

FIG. 3 is a diagram showing a processing procedure of automated driving. First, as shown in an upper diagram, a route is determined by the navigation device 230. This route, for example, is a rough route in which lanes are not distinguished.

Next, as shown in a middle diagram, the recommended lane determining device 240 determines recommended lanes enabling the vehicle to easily travel along a route. As shown in a lower diagram, the automated driving controller 250 generates locus points for traveling along recommended lanes as far as possible while performing avoidance of obstacles and the like and performs control of some or all of the driving force output device 260, the braking device 262, and the steering device 264 such that the vehicle travels along the locus points (and with an accompanying speed profile). In addition, such role sharing is merely one example, and, for example, the automated driving controller 250 may perform the process in a centralized manner.

Furthermore, the automated driving controller 250 stops the vehicle 200 after causing the vehicle 200 to travel to a designation position that is designated by a user U desiring co-riding.

The driving force output device 260 outputs a traveling driving force (torque) for causing the vehicle 200 to travel to drive wheels. The driving force output device 260, for example, includes a combination of an internal combustion engine, an electric motor, a transmission gear, and the like and a power electronic control unit (ECU) controlling these. The power ECU controls the components described above in accordance with information input from the automated driving controller 250 or information input from driving operators not shown in the drawing.

The braking device 262, for example, includes a brake caliper, a cylinder delivering hydraulic pressure to the brake caliper, an electric motor generating hydraulic pressure in the cylinder, and a brake ECU. The brake ECU performs control of an electric motor in accordance with information input from the automated driving controller 250 or information input from the driving operator such that a brake torque according to a braking operation is output to each vehicle wheel.

The braking device 262 may include a mechanism that delivers a hydraulic pressure generated in accordance with an operation on a brake pedal included in the driving operator to the cylinder through a master cylinder as a backup. The braking device 262 is not limited to the configuration described above and may be an electronic control-type hydraulic braking device that delivers a hydraulic pressure of the master cylinder to the cylinder by controlling an actuator in accordance with information input from the automated driving controller 250.

The steering device 264, for example, includes a steering ECU and an electric motor. The electric motor, for example, changes the direction of steered wheels by applying a force to a rack and pinion mechanism. The steering ECU changes the direction of the steered wheel by driving an electric motor in accordance with information input from the automated driving controller 250 or information input from the driving operator.

[Vehicle Information Providing Device]

Referring back to FIG. 1, the vehicle information providing device 300, for example, includes a communicator 310, an acquisition unit 320, a plan setting unit 330, an information providing unit 340, and a storage unit 380.

The communicator 310, for example, is a network card used for connection to the network NW. In addition, the storage unit 380 is realized by a hard disk drive (HDD), a flash memory, a random access memory (RAM), a read only memory (ROM), or the like. The communicator 310 communicates with the terminal device 100 and the vehicle 200 through the network NW.

The acquisition unit 320 and the plan setting unit 330, for example, are realized by a processor (circuit) such as a CPU or the like executing a program (software) stored in the storage unit 380. Some or all of such functional units may be realized by hardware such as a large scale integration (LSI), an application specific integrated circuit (ASIC), a field-programmable gate array (FPGA), a graphics processing unit (GPU), and the like or may be realized by software and hardware in cooperation.

The acquisition unit 320 acquires a destination transmitted from the terminal device 100 of the user U through the communicator 310 and the network NW and registers the acquired destination in the storage unit 380 as destination data 384. The destination data 384 includes destinations of a plurality of other vehicles 200. In addition, the user information 382 includes personal information and the like of the user U.

The acquisition unit 320 acquires the current position of the terminal device 100 to which a destination has been input by a user or a position designated by the terminal device 100. In addition, the acquisition unit 320 acquires information of one or more vehicles operated to the destination of the user U at present or a predetermined time.

The plan setting unit 330 estimates a destination on the basis of information input by the user U. The plan setting unit 330, for example, may estimate a destination using speech realized using artificial intelligence (AI). The plan setting unit 330 sets a travel plan of the vehicle 200 on the basis of the destination data 384. In addition, the plan setting unit 330 manages billing in a case in which the user U uses the vehicle 200. In a billing process, there are a provisional billing and a main billing, and, a provisional billing state is a state in which payment has not been completed. A state in which payment has been completed is formed in accordance with a main billing.

The plan setting unit 330 transmits a set travel plan to the vehicle 200 through the communicator 310. The information providing unit 340 also provides information relating to a destination to terminal devices 100 of users U other than a user U who has input information relating to the destination representing details of a purpose of the vehicle 200 traveling to the destination on the basis of the set travel plan.

[Allocation Process]

Hereinafter, an example in which a vehicle 200 is allocated for allowing a user U (a first user) to ride in the vehicle 200 to a destination using the vehicle information providing system 1 will be shown. The terminal device 100 acquires data of a destination and the like on the basis of an input operation on an input screen that is performed by the user U.

The destination, for example, is set on the basis of a search query input by the user U from the input screen of the terminal device 100. Alternatively, the destination may be selected from among destinations recommended on the input screen or may be selected on the basis of a past input history of the user U. Details of the destination are determined by the terminal device 100 accepting an input from the user U and are transmitted to the vehicle information providing device 300. The input information is transmitted to the vehicle information providing device 300 as information relating to the destination. The vehicle information providing device 300 updates the destination data 384 of the storage unit 380.

Figure 4:
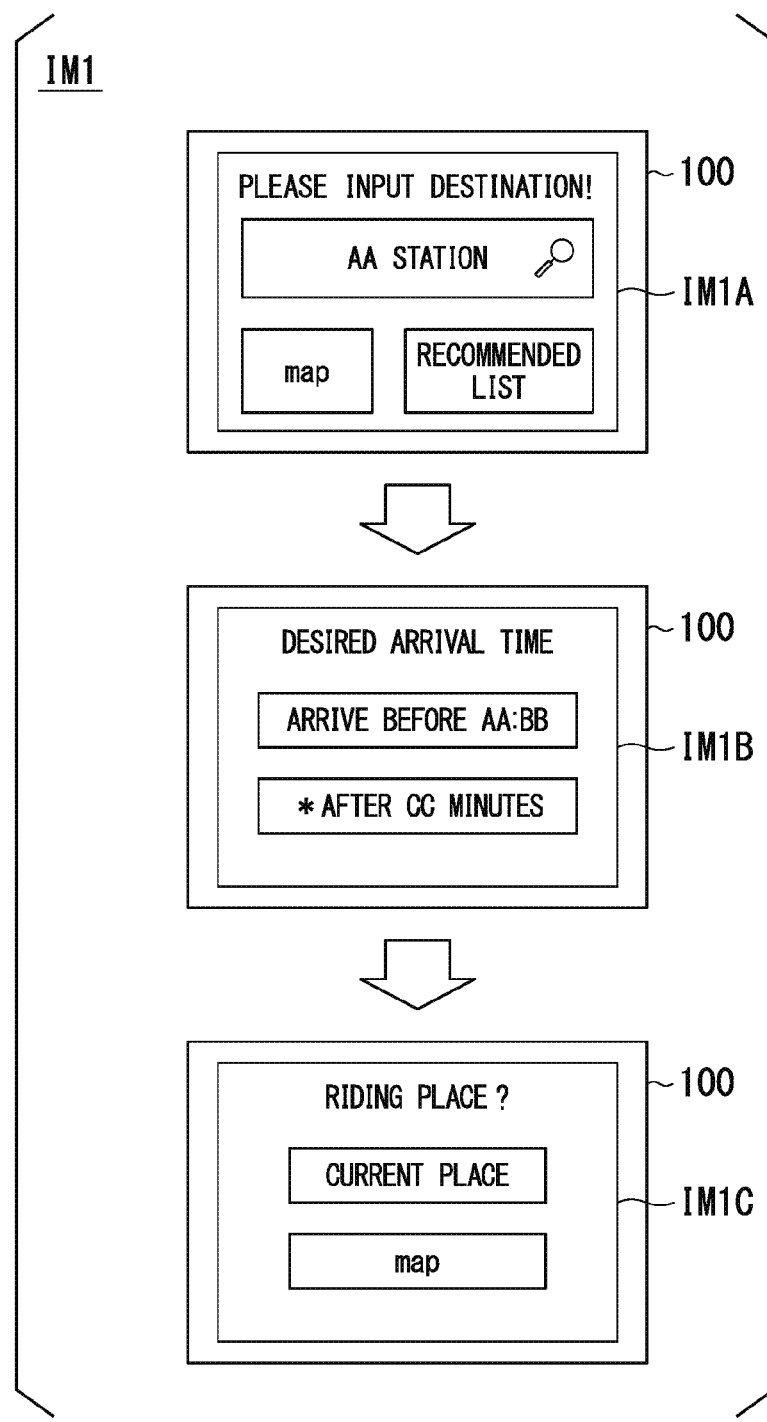
FIG. 4 is a diagram showing one example of an image displayed in a terminal device for inputting information relating to a destination.

FIG. 4 is a diagram showing one example of an image IM1 displayed in the terminal device 100 for inputting information relating to a destination.

For example, a user U inputs a destination on an image IM1A. A destination is selected by inputting a search query or is selected from a recommended list of destinations. In addition, a destination may be determined by tapping on a position on a map.

For example, a destination may be presented on the basis of an Internet browsing history of the user U. For example, when a user U inputs a destination by operating a ride sharing application of the terminal device 100, the terminal device 100 accesses the plan setting unit 330. For example, on the basis of a latest Internet browsing history of the user U, the plan setting unit 330 extracts a destination relating to a category of which a degree of user preference is high. When a destination is presented, for example, a ranking of search words on the Internet may be referred to. In addition, on the basis of speech, a gesture, or the like of the user, a destination may be input using an AI learning function for automatically setting a destination.

The plan setting unit 330 automatically displays extracted destinations on the input screen of the terminal device 100. At this time, the plan setting unit 330 may cause the display 120 of the terminal device 100 to present a plurality of destinations as a recommended list and allow a user U to select one destination.

In addition, the plan setting unit 330 may input data to the terminal device 100 with a specific vehicle 200 designated. In addition, the plan setting unit 330, for example, may display a vehicle model of vehicles 200 desired by the user U on an input screen of the terminal device 100. The user U, for example, may input a model according to his or her taste such as a minivan, a sedan, a compact car, or the like to the terminal device 100.

The plan setting unit 330 receives information relating to a destination through the communicator 310. At this time, the plan setting unit 330 may also transmit attribute information of a user U in association with an ID of the user U. The attribute information, for example, includes age, sex, and the like of the user U and is a category of individuals to which the user U belongs.

For example, the plan setting unit 330 estimates a destination of a user on the basis of an input search query. For example, a user inputs a query relating to a destination in a search field on the image IM1A. Next, the plan setting unit 330, for example, allows a user U to input additional information required for operating the vehicle to a destination on the image IM1B. The additional information, for example, is an arrival time at the destination that is desired by the user U. As this time, a time may be set accurately like "arriving before XX:YY" or may be set not necessarily accurately like "after OO minutes".

Next, the user U inputs a desired riding location on an image IM1C to which the image has been switched. The user U selects a current place in a case in which riding from the current place is desired or designates, for example, a location on the map in a case in which riding from a designated location is desired. For example, the current place is acquired using a GPS sensor built into the terminal device 100 or the like in association with an operation of the user U.

Next, the plan setting unit 330 searches for allocable vehicles 200 in the vicinity of the user U. The plan setting unit 330, for example, extracts allocable vehicles 200 on the basis of vehicle operation information 386. The plan setting unit 330 selects a vehicle 200 that can move the user U to a destination on the basis of the place of the destination that has been retrieved and the current location of the vehicle 200. The plan setting unit 330 searches for vehicles 200 that can be allocated for the destination by referring to the vehicle operation information 386.

FIG. 5 is a diagram showing one example of details of the vehicle operation information 386. The vehicle operation information 386 is information in which a vehicle allocation flag representing whether or not vehicle allocation has been determined (for example, "1" represents that vehicle allocation has been determined, and "0" represents that vehicle allocation has not been determined), a current place, a departure place, a transit point, a destination, a purpose, the number of vacant seats, a departure time, an arrival time, and the like are associated with a vehicle ID that is identification information of the vehicle 200 managed by the vehicle information providing device 300. When there is a change in the vehicle operation information 386, it is appropriately updated by the plan setting unit 330.

The plan setting unit 330 extracts a plurality of vehicles 200 within a predetermined range from the current place of the user from among vehicles of which allocation has not been determined by referring to the vehicle operation information 386. At this time, the plan setting unit 330, as will be described later, may select vehicles of which allocation has been determined. The plan setting unit 330 selects a vehicle 200 that can arrive at the destination from the riding location of the user U at a desired arrival time among the extracted vehicles 200 on the basis of the destination data 384.

The plan setting unit 330 sets a traveling plan of the selected vehicle 200 on the basis of the destination data 384. The information providing unit 340 causes the terminal device 100 to display location information of the vehicles 200 that can be allocated.

Figure 6:
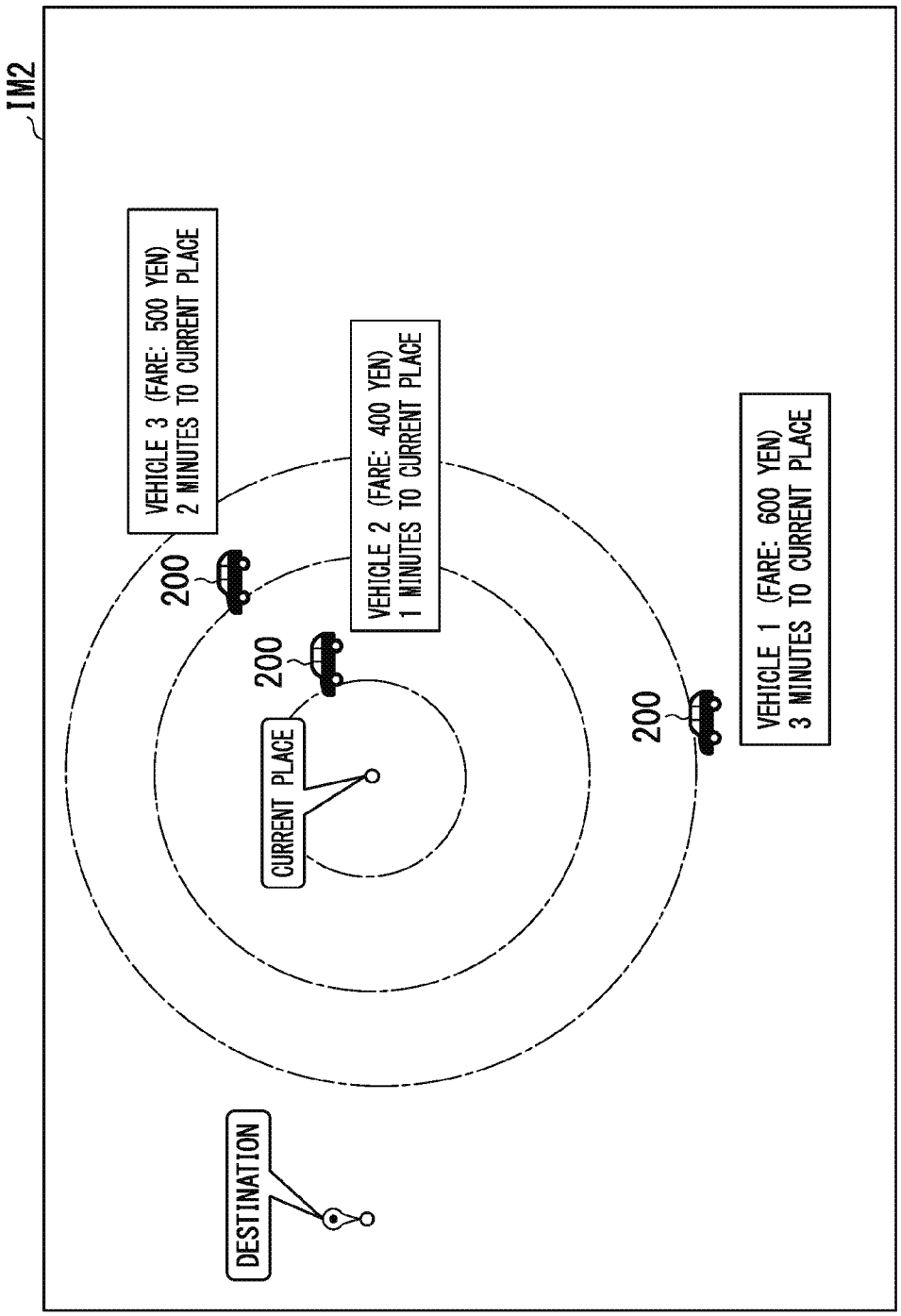
FIG. 6 is a diagram showing one example of an image in which vehicles, which can be allocated, located in the vicinity of a user are displayed.

FIG. 6 is a diagram showing one example of an image IM2 in which vehicles 200, which can be allocated, located in the vicinity of a user U are displayed. The vehicles 200, which are located within a predetermined range from a current place of the user U, that can be allocated are displayed in the image IM2. Information such as a time required up to the current place of the user U, a fare, and the like is displayed near each vehicle 200. For example, fares are set to be cheaper in order of closest to farthest from the current place of the user U.

When the user U taps on a vehicle 200 desired to ride in the image IM2, information relating to the vehicle 200 and a button used for inputting a riding request for the vehicle 200 are displayed using an image IM3 in the terminal device 100.

Figure 7:
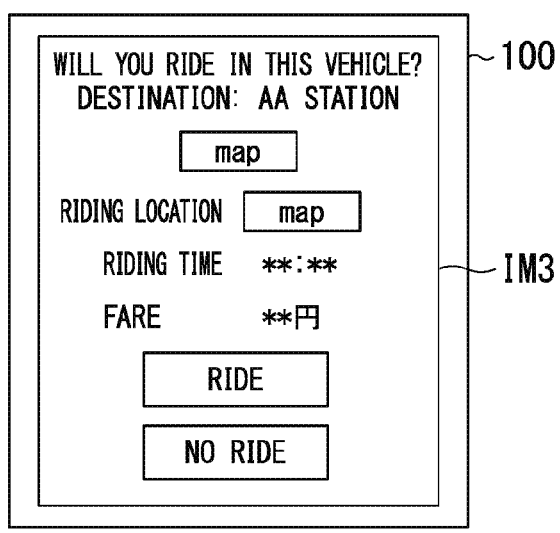
FIG. 7 is a diagram showing one example of an image in which information relating to traveling of a vehicle and a button used for inputting a riding request are displayed.

FIG. 7 is a diagram showing one example of an image IM3 in which information relating to traveling of a vehicle 200 and a button used for inputting a riding request are displayed. For example, buttons such as "riding", "no-riding", and the like used for indicating presence/absence of a request for riding the vehicle 200 are displayed in the image IM3.

When the user U indicates a desire to ride in the vehicle 200 by operating the image IM3, the plan setting unit 330 transmits information relating to acceptance/non-acceptance of the riding for the selected vehicle 200 through the communicator 310. For example, an image used for inquiring about acceptance/no-acceptance of the riding is displayed in the terminal device 100 of the user U.

A vehicle occupant of the vehicle 200 accepts riding of the user U by operating the terminal device 100. When riding of the user U is accepted, the plan setting unit 330 sets a travel plan from the riding location of the user U to the destination. The plan setting unit 330 updates the vehicle operation information 386 on the basis of the determined route. The plan setting unit 330 transmits information relating to the route to the terminal device 100.

Figure 8:
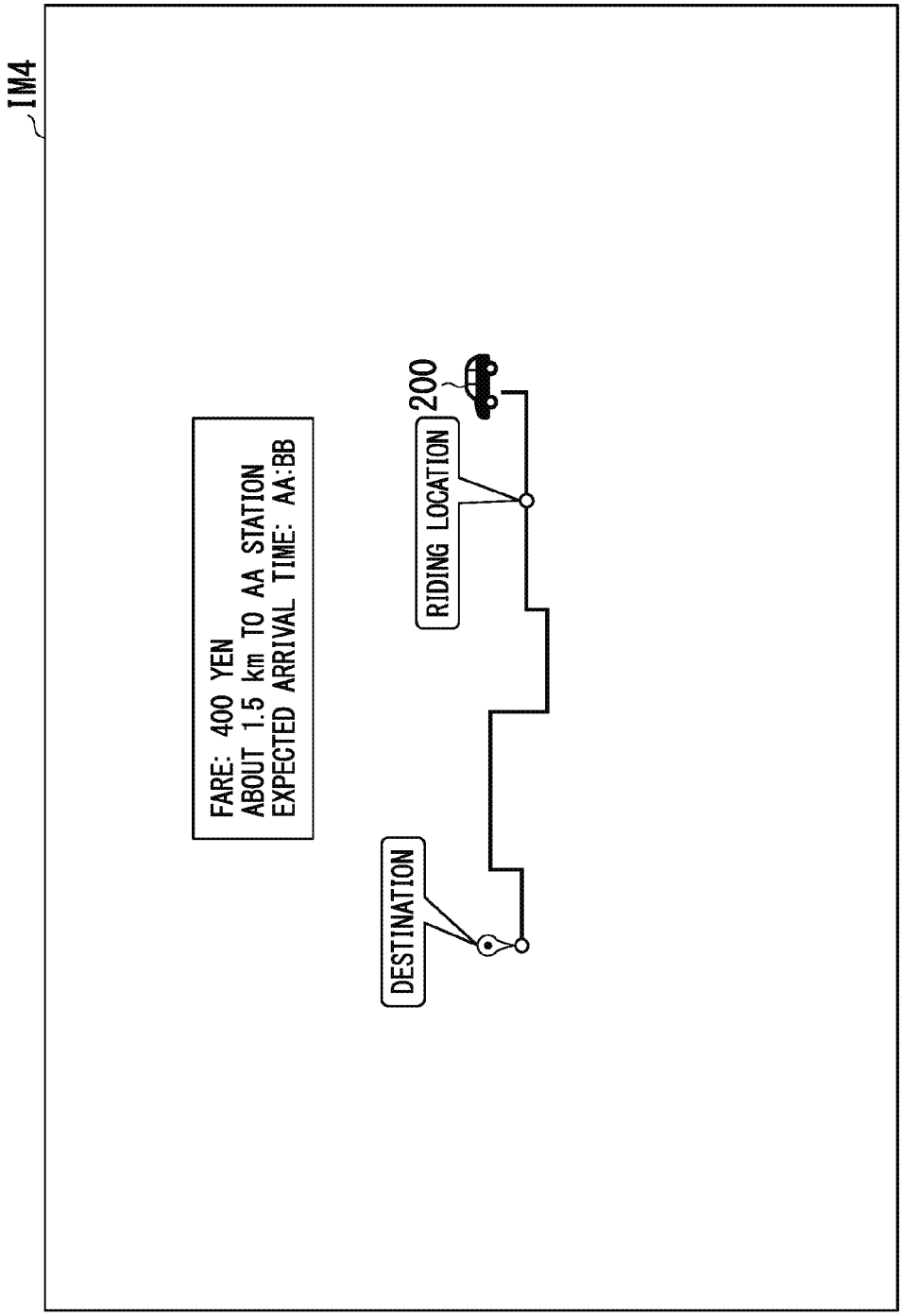
FIG. 8 is a diagram showing one example of an image representing a route, a current place, a riding location, a destination, and the like of a vehicle displayed in a terminal device.

FIG. 8 is a diagram showing one example of an image IM4 representing a route, a current place, a riding location, a destination, and the like of a vehicle 200 displayed in a terminal device 100. In addition, the plan setting unit 330 transmits information relating to the travel plan to the vehicle 200. At this time, the plan setting unit 330 provisionally bills the user U who desires riding. The vehicle 200 allows the user U to ride at the riding location and travels along the route to the destination on the basis of the received travel plan.

[Ride Sharing]

The vehicle 200 allowing the user U to ride therein up to the destination may allow another user U (a second user) to ride together up to the destination or along a route that is in the way of the destination.

In a case in which the vehicle 200 is being operated with the user U (the first user) riding therein, the information providing unit 340 of the vehicle information providing device 300 provides the vehicle operation information 386 of the vehicle 200 to the outside of the vehicle. Here, for example, the providing of the vehicle operation information 386 to the outside of the vehicle represents the information providing unit 340 providing the vehicle operation information 386 to the terminal device 100 and the like disposed outside (for example, outside the vehicle) through the Internet of the network NW.

A user U (a second user) desiring co-riding inputs a destination to an input screen of the ride sharing application of the terminal device 100.

The terminal device 100 accepts an input of a destination from a user U desiring co-riding on the basis of a search query. For example, the input of the destination is performed through a text input from the display 120. The input of the destination may be performed using a device detecting speech, brain waves, gestures, and lines of sight in addition to an input of texts.

The plan setting unit 330 extracts a vehicle 200 in which a travel plan for traveling toward or through a destination of the user U desiring co-riding is set, a vehicle 200 having a distance from the user U to be within a predetermined range, a vehicle 200 in which a travel plan is set in accordance with conditions relating to the vehicle 200, and the like on the basis of the vehicle operation information 386.

For example, a vehicle 200 in which a travel plan is set in accordance with conditions relating to the vehicle 200 is a vehicle 200 moving to the destination according to a route guide of the navigation device of the vehicle 200. For example, the plan setting unit 330 requests the user U to select one vehicle among such vehicles 200 through the terminal device 100. The terminal device 100 may display the vehicle 200 for each destination or the like.

For example, the user U selects a vehicle 200 traveling toward his or her own destination among a plurality of vehicles 200 displayed in the display 120. The user U may select a vehicle 200 having a distance from the user U to be within a predetermined range or may select a vehicle 200 in which a travel plan is set in accordance with conditions relating to the vehicle 200. However, in a case in which the user selects a vehicle 200 traveling toward his or her destination, the degree of change in the travel plan becomes low.

Figure 9:
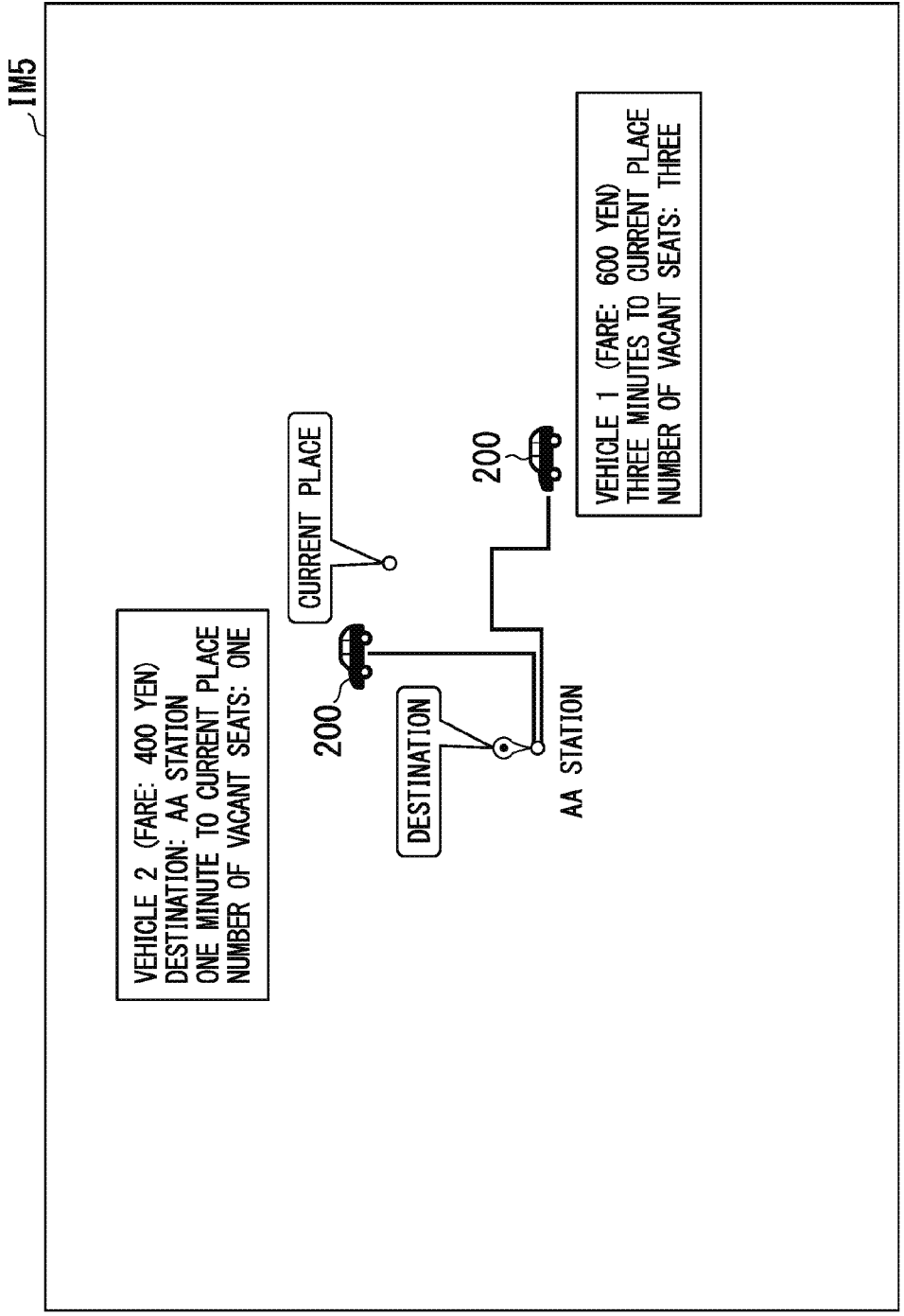
FIG. 9 is a diagram showing one example of an image representing positions of vehicles moving toward the same destination.

The information providing unit 340 provides information relating to the vehicle 200 for a terminal device 100 of a user U desiring co-riding. FIG. 9 is a diagram showing one example of an image IM5 representing a location of a vehicle 200 operated toward the same destination.

For example, an image IM5 in which a vehicle 200 located within a predetermined range from the current place on a map as its center is displayed is displayed in the display 120 of the terminal device 100. When the user U taps on the vehicle 200 in the image IM5, an image IM6 representing information of the vehicle 200 is displayed. FIG. 10 is a diagram showing one example of an image IM6 representing information of a vehicle 200 operated toward a destination.

For example, in addition to a destination, an expected arrival time at the current place, a desired arrival time at the destination, the number of vacant seats, and a fare, buttons used for requesting riding in the vehicle 200 are displayed in the image IM6. The user U requests to ride in the vehicle 200 by performing an operation by touching the image IM6 on the screen of the terminal device 100.

FIG. 11 is a diagram showing one example of an image IM7 for inputting information displayed in the terminal device 100. In a case in which the user U performs an operation for requesting to ride in the vehicle 200 using the terminal device 100, an image IM7 for inputting a desired riding location of the user U for the vehicle 200 is displayed in the terminal device 100. Since the vehicle 200 is in the middle of an operation or is planned to be operated in accordance with a predetermined travel plan, a riding time of the user U is adjusted by the plan setting unit 330.

Here, information relating to attributes of the user U riding in the vehicle 200 may be displayed in the image IM7. For example, when the user U presses a button of "user attributes" disposed in the image IM7, information of "passenger (1): Male 50's, passenger (2): Female 30's, and passenger (3): Female 20's" and the like may be displayed by switching the image in the terminal device 100. Then, the user U may determine whether to ride in the vehicle or not by referring to the information relating to the attributes. In addition, more detailed information such as a profile may be added in relation with the user U in addition to the information of the attributes of the image IM6 and be displayed.

After the user U designates a riding location, co-passenger information 101 including an ID of the user U, an ID of a vehicle 200 desired to ride, a current location of the user U, and a desired riding location is transmitted to the vehicle information providing device 300. In addition, the attribute information of the user U may be also included in the co-passenger information 101. FIG. 12 is a diagram showing one example of details of the co-passenger information 101.

After receiving the co-passenger information 101, the plan setting unit 330 newly derives a travel plan after change (a second travel plan) for moving the user U (a first user) riding in the vehicle 200 and a user U desiring co-riding in a (second) route for allowing the user U (a second user) desiring co-riding to ride by changing a (first) route of the vehicle 200 traveling in accordance with a (first) travel plan.

The vehicle 200 travels in a route that detours more than the original plan in order to allow the user U desiring co-riding to ride therein. At this time, the plan setting unit 330 determines whether or not users riding in the vehicle 200 will be moved to the destination before a desired arrival time before change (a first time) in a case in which the vehicle travels in accordance with the travel plan after change.

In a case in which it is determined that the users U riding in the vehicle 200 will be moved to the destination before the desired arrival time before change in the travel plan after change, the plan setting unit 330 causes the communicator 310 to transmit information for inquiring about acceptance/no-acceptance of permission for co-riding of the user U desiring co-riding to the terminal device 100 used by the user U riding in the vehicle 200. An image IM8 for inquiring about whether or not co-riding is accepted is displayed in the terminal device 100 used by the user U riding in the vehicle 200.

Figure 13:
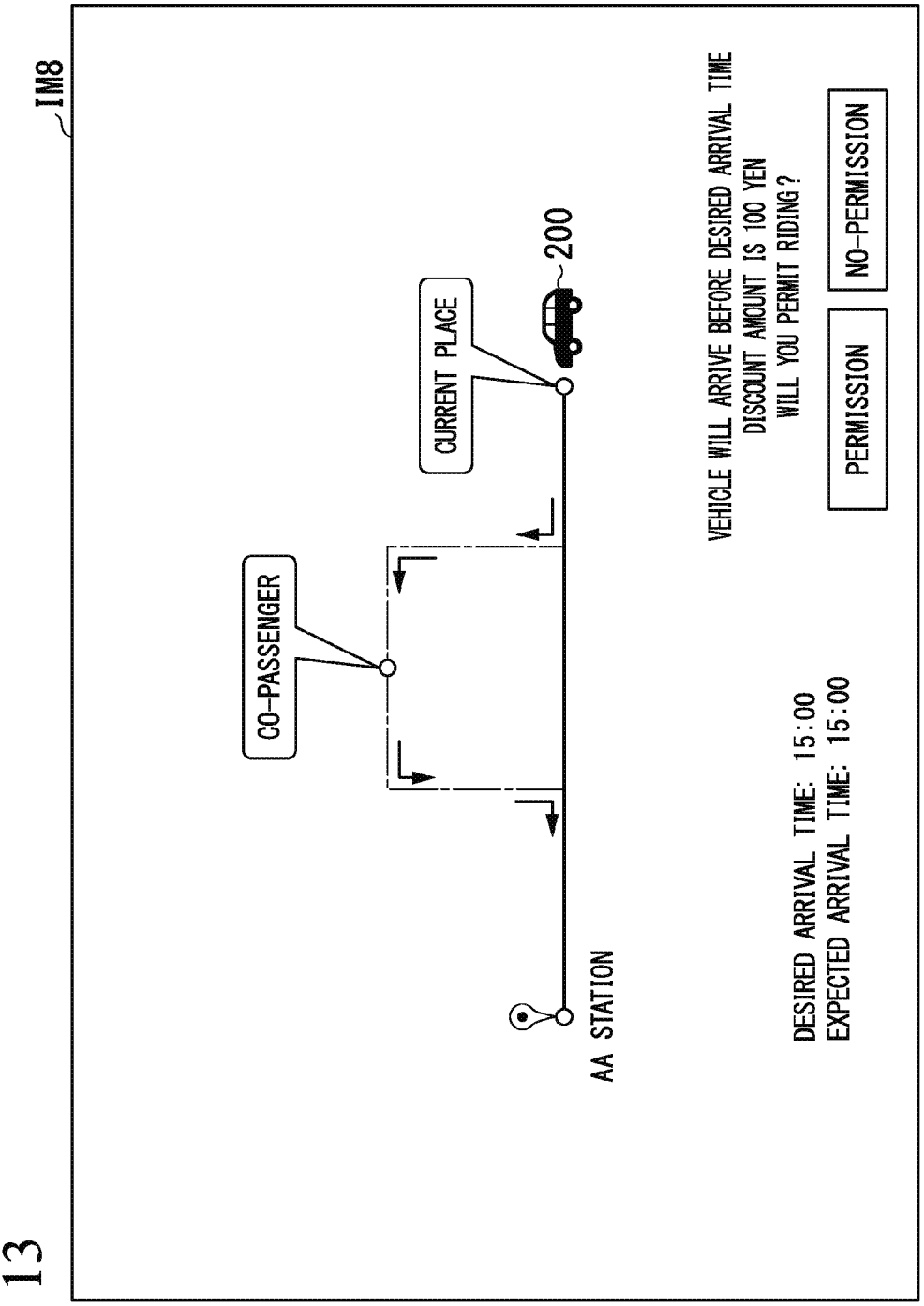
FIG. 13 is a diagram showing an image for an inquiry about acceptance/non-acceptance of co-riding in a case in which there will be arrival at a destination before an arrival time.

FIG. 13 is a diagram showing an image IM8 for an inquiry about acceptance/no-acceptance of co-riding in a case in which there will be arrival at a destination before an arrival time. The terminal device 100 in which the image IM8 is displayed transmits information indicating permission for co-riding in accordance with an operation of the user U.

In a case in which the information of an indication of permission for co-riding is received by the communicator 310, the plan setting unit 330 sets the travel plan after change to a travel plan instead of the travel plan before change. For example, in a case in which a desired arrival time is set to 15 o'clock, when it is predicted that the vehicle 200 that is currently traveling arrives at the destination before 15 minutes, the travel plan after change can be set to the travel plan.

At this time, the plan setting unit 330 discounts a charge, which is provisionally billed, for the user U riding in the vehicle 200 by a predetermined discount amount (a first discount amount). For the discount, a coupon may be issued, or points may be assigned.

In addition, in a case in which the plan setting unit 330 determines that the users U riding in the vehicle 200 will not be moved to the destination before the desired arrival time before change in the travel plan after change, the plan setting unit 330 causes the communicator 310 to transmit information for inquiring about whether or not permission for co-riding of the user U desiring co-riding is accepted to the terminal device 100 used by the user U riding in the vehicle 200. An image IM9 for inquiring about whether or not co-riding is accepted even in a case in which the arrival time is later than the desired arrival time is displayed in the terminal device 100 used by the user U riding in the vehicle 200.

Figure 14:
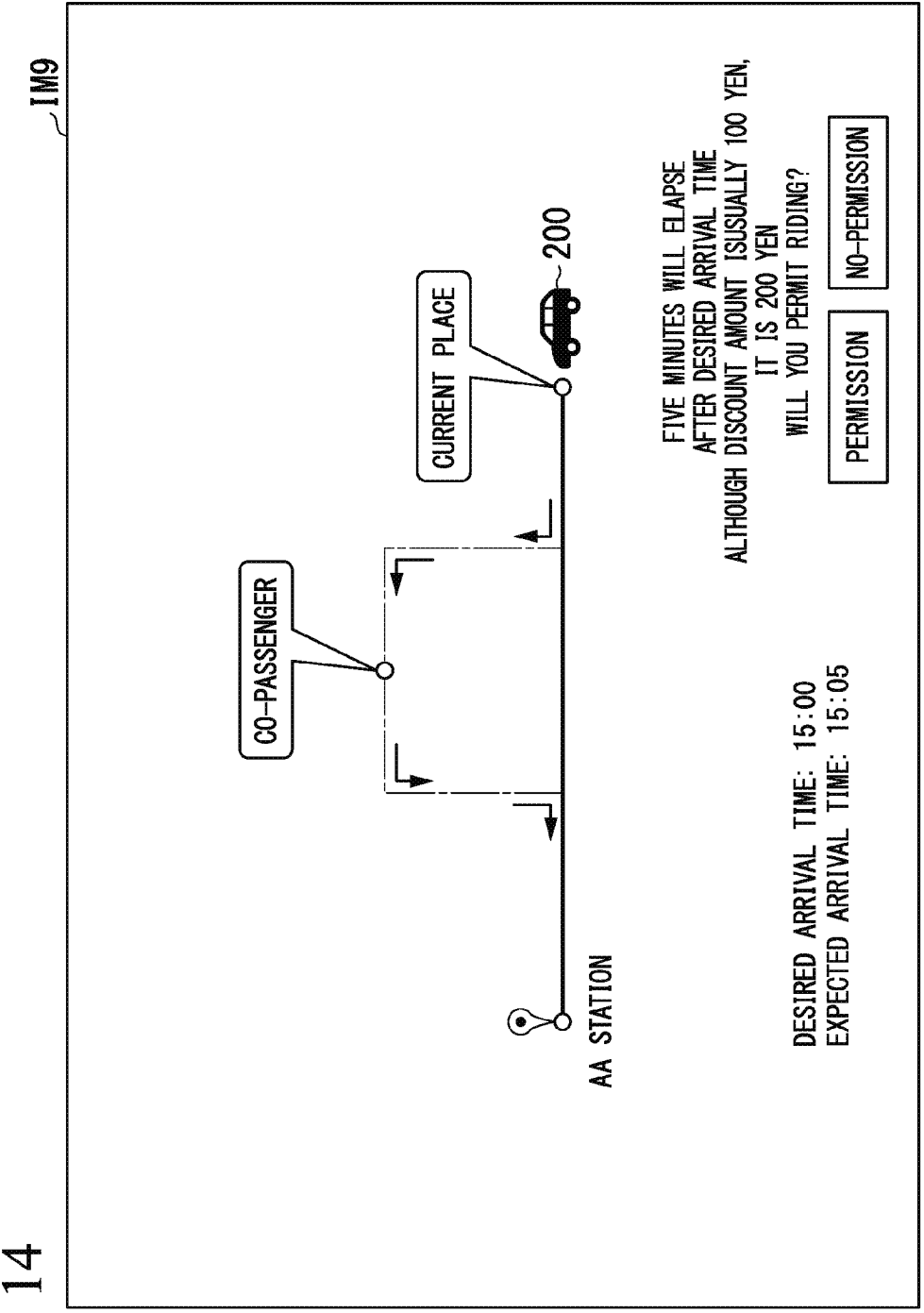
FIG. 14 is a diagram showing an image for an inquiry about acceptance/non-acceptance of co-riding in a case in which arrival at a destination will be after an arrival time.

FIG. 14 is a diagram showing an image IM9 for an inquiry about acceptance/no-acceptance of co-riding in a case in which arrival at a destination will be after an arrival time. The terminal device 100 in which the image IM9 is displayed transmits information indicating permission for co-riding in accordance with an operation of the user U.

In a case in which the information indicating permission for co-riding is received by the communicator 310, the plan setting unit 330 sets the travel plan after change to the travel plan instead of the travel plan before change. For example, in a case in which the desired arrival time is set to 15 o'clock, when it is predicted that the vehicle 200 that is currently traveling arrives at the destination after 15 minutes, the travel plan after change can be set to the travel plan.

At this time, the plan setting unit 330 discounts the charge, which has been provisionally billed, for the first user by a discount amount (a second discount amount) larger than the discount amount in a case in which the vehicle arrives at the destination before the desired arrival time. In other words, in a case in which the desired arrival time of a user U riding in the vehicle 200 is delayed, the plan setting unit 330 urges the user U riding in the vehicle 200 to permit co-riding by presenting a larger discount amount.

In a case in which information indicating permission for co-riding is received by the communicator 310, the plan setting unit 330 sets the travel plan after change to the travel plan instead of the travel plan before change. For example, the plan setting unit 330 transmits the travel plan after change to the vehicle 200. The vehicle 200 travels along a route which allows a user U desiring co-riding to co-ride therein on the basis of the changed travel plan. When the vehicle 200 arrives at the destination, and a plurality of users 20 get off the vehicle, the plan setting unit 330 performs main billing of each user 20.

[Processing Sequence]

Figure 15:
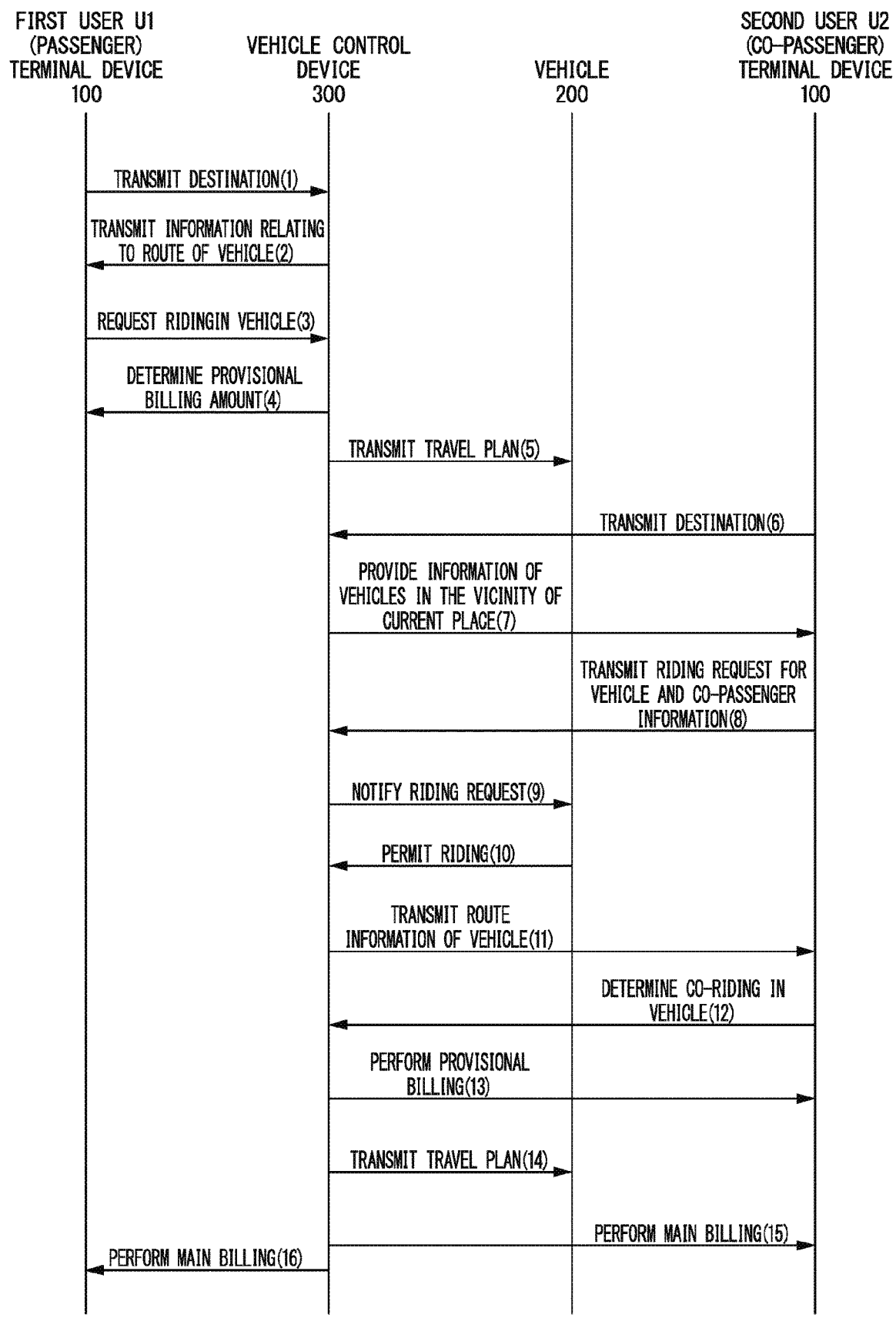
FIG. 15 is a sequence diagram showing processes among components of a vehicle information providing system.

Next, relations of processes among the components of the vehicle information providing system 1 will be described. FIG. 15 is a sequence diagram showing processes among components of the vehicle information providing system 1.

First, the terminal device 100 accepts an input of a destination of the first user U1 who desires to move to a destination by riding in the vehicle 200 and transmits information including the destination to the vehicle information providing device 300 (1). The vehicle information providing device 300 searches for the destination, selects a vehicle 200 that can be allocated to the retrieved destination 200, and transmits information relating to a route to the destination of the selected vehicle 200 (2).

Next, the terminal device 100 accepts an input of a desire to ride in the vehicle 200 according to a first user U1 and transmits information relating to the accepted vehicle riding request to the vehicle information providing device 300 (3). The vehicle information providing device 300 provisionally bills the first user U1 on the basis of the vehicle riding request from the user U (4). The vehicle information providing device 300 sets a travel plan of the set route to the destination and transmits the set travel plan to the vehicle 200 (5).

The terminal device 100 accepts an input of a destination of a user U desiring co-riding and transmits the accepted destination to the vehicle information providing device 300 (6). The vehicle information providing device 300 extracts vehicles 200 that are being operated or are planned to be operated toward the destination input by the user U desiring co-riding and provides information of the extracted vehicles 200 for the terminal device 100 (7).

When selection of a vehicle 200 being operated toward the destination of a second user U2 desiring co-riding is accepted in accordance with an operation of the user U desiring co-riding, the terminal device 100 transmits a vehicle riding request for the vehicle 200 and co-passenger information 101 for co-riding in the vehicle 200 to the vehicle information providing device 300 (8).

The vehicle information providing device 300 notifies the vehicle 200 of presence of a vehicle riding request and requests permission for changing the travel route and the arrival time (9). The vehicle 200 transmits permission for co-riding to the vehicle information providing device 300 in accordance with an operation of a vehicle occupant (10). After receiving the permission for co-riding, the vehicle information providing device 300 changes the travel plan of the vehicle 200 on the basis of the co-passenger information 101 and transmits route information based on the travel plan to the terminal device 100 (11). The terminal device 100 transmits notification of determining riding in the vehicle 200 in accordance with an input operation of the user U desiring co-riding (12).

The vehicle information providing device 300 provisionally bills the second user U2 on the basis of the determination of the co-riding of the user U desiring co-riding (13). The vehicle information providing device 300 transmits a travel plan which allows co-riding of the second user U2 to the vehicle 200 (14). In a case in which the first user U1 and the second user U2 get off the vehicle, the vehicle information providing device 300 performs main billing for the first user U1 and the second user U2 (15) and (16).

[Processing Flow]

Figure 16:
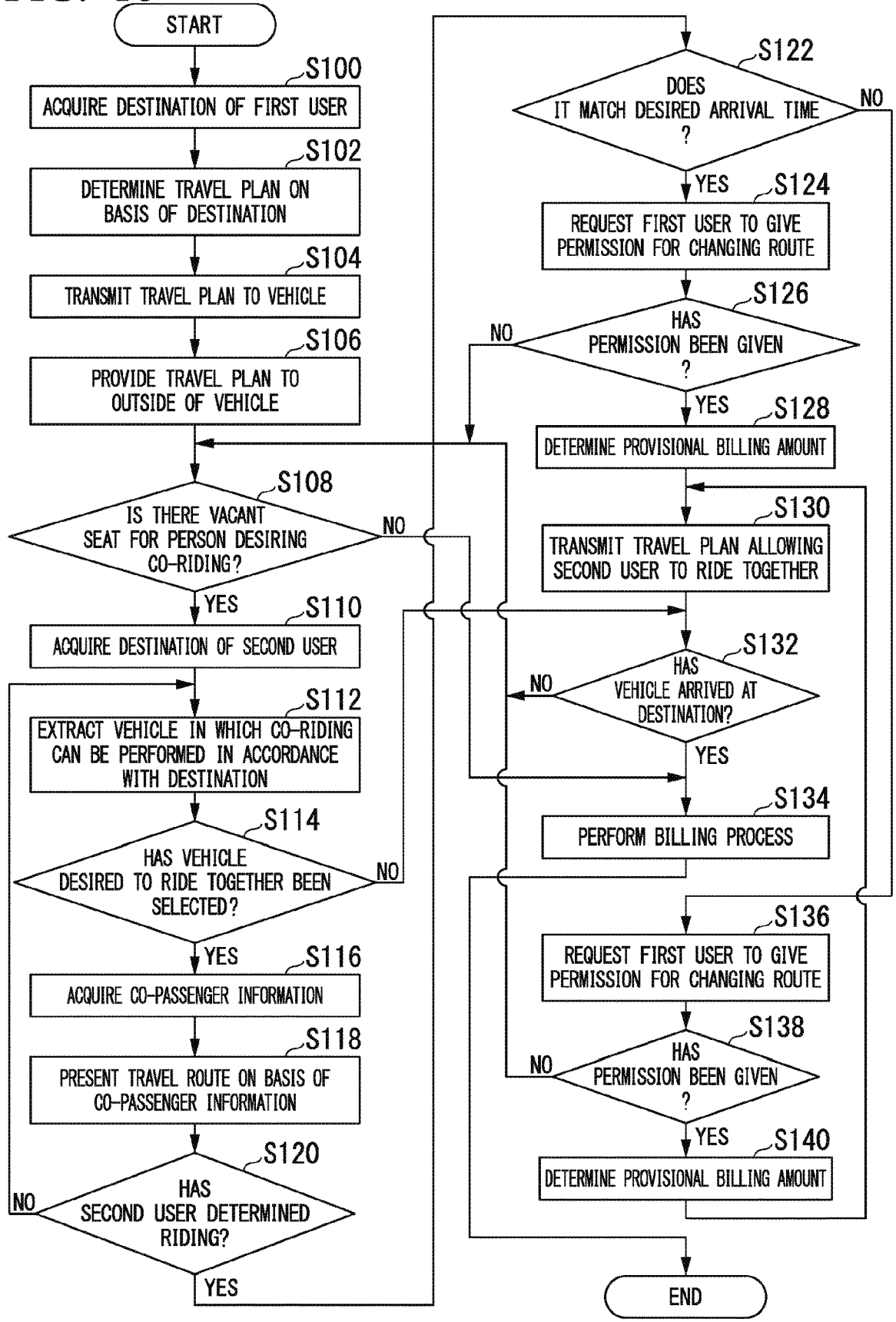
FIG. 16 is a flowchart showing one example of the flow of a process performed by a vehicle information providing device.

Next, a process performed by the vehicle information providing device 300 will be described. FIG. 16 is a flowchart showing one example of the flow of a process performed by the vehicle information providing device 300.

The acquisition unit 320 acquires a destination of a user U (a first user) (Step S100). Next, the plan setting unit 330 determines a travel plan on the basis of the destination (Step S102). Next, the plan setting unit 330 transmits the travel plan to the vehicle 200 (Step S104). The vehicle 200 allows the user to ride therein and travels toward the destination. Next, the plan setting unit 330 causes the information providing unit 340 to provide the travel plan of the vehicle 200 that is in the middle of traveling to the outside of the vehicle (Step S106).

Next, the plan setting unit 330 determines whether or not there is a vacant seat on which a person desiring co-riding can ride in the vehicle 200 (Step S108). Next, in a case in which there is a vacant seat, the acquisition unit 320 acquires a destination of a user U (a second user) desiring co-riding (Step S110). In a case in which there is no vacant seat, the vehicle information providing device 300 ends the process of the flowchart, and the vehicle 200 travels up to the destination.

Next, the plan setting unit 330 extracts a vehicle 200, in which co-riding can be performed, in accordance with the destination (Step S112). Next, the plan setting unit 330 determines whether or not the vehicle 200 in which co-riding is desired has been selected (Step S114). Next, in a case in which the vehicle 200 has been selected, the acquisition unit 320 acquires co-passenger information 101 of the user U desiring co-riding (Step S116). In a case in which the vehicle 200 has not been selected, the plan setting unit 330 proceeds to the process of Step S132.

Next, the plan setting unit 330 derives a travel plan on the basis of the co-passenger information 101 and causes the terminal device 100 of the user U desiring co-riding to present a travel route (Step S118). Next, the plan setting unit 330 determines whether or not the user U desiring co-riding has determined riding on the basis of notification from the terminal device 100 of the user U desiring co-riding (Step S120).

In a case in which the user U desiring co-riding has determined co-riding, the plan setting unit 330 derives a travel plan for allowing the user U desiring co-riding to ride in the vehicle and determines whether or not the vehicle 200 can arrive at the destination before a desired arrival time of the user U who has already ridden in the vehicle 200 (Step S122). Next, the plan setting unit 330 causes the terminal device 100 of the user U who is riding in the vehicle 200 to display notification requesting permission for changing a route and changing an arrival time (Step S124).

Next, the plan setting unit 330 determines whether the user U who is riding in the vehicle 200 permits co-riding on the basis of a reply from the terminal device 100 of the user U who is riding in the vehicle 200 (Step S126).

Next, in a case in which the user U who is riding in the vehicle 200 permits co-riding, the plan setting unit 330 performs a billing process by discounting a charge for the user U who is riding in the vehicle 200 by a predetermined discount amount (a first discount amount) and provisionally billing the user U desiring co-riding (Step S128). In a case in which the user U who is riding in the vehicle 200 does not permit co-riding, the plan setting unit 330 causes the process to return to the process of Step S108.

Next, the plan setting unit 330 transmits the derived travel plan to the vehicle 200 (Step S130). Next, the plan setting unit 330 determines whether or not the vehicle 200 has arrived at the destination (Step S132). In a case in which the vehicle has arrived at the destination, the plan setting unit 330 performs a billing process of main billing at a timing at which each user U gets off the vehicle (Step S134) and thereafter ends the process of the flowchart. In a case in which the vehicle has not arrived at the destination, the plan setting unit 330 causes the process to return to the process of Step S108.

In a case in which "No" is determined in Step S122, the plan setting unit 330 causes the terminal device 100 of the user U riding in the vehicle 200 to display notification requesting permission for changing the route and delaying the arrival time (Step S136). Next, the plan setting unit 330 determines whether or not the user U riding in the vehicle 200 permits co-riding on the basis of a reply from the terminal device 100 of the user U riding in the vehicle 200 (Step S138).

Next, in a case in which the user U riding in the vehicle 200 permits co-riding, the plan setting unit 330 performs a billing process by discounting a fare for the user U riding in the vehicle 200 with a discount amount (a second discount amount) larger than the first discount amount and provisionally billing the user U desiring co-riding (Step S140). In a case in which the user U riding in the vehicle 200 does not permit co-riding, the plan setting unit 330 causes the process to return to the process of Step S108.

According to the vehicle information providing system 1 described above, in a case in which a second user is allowed to co-ride in the vehicle 200, in which the first user is riding, traveling toward the destination, the route of the vehicle 200 can be changed for allowing the second user to co-ride. At this time, in a case in which the vehicle cannot arrive at the destination before a desired arrival time of the first user, the vehicle information providing system 1 can change the route of the vehicle 200 on the basis of permission for the first user and discount a fare for the first user.

While forms for performing the present invention have been described using the embodiments as above, the present invention is not limited to such embodiments at all, and various modifications and substitutions can be made within a range not departing from the concept of the present invention. For example, although the vehicle information providing system 1 has been described to discount a fare for a user U riding in the vehicle 200 in a case in which a co-passenger is allowed to ride together, a fare for the user U may be additionally discounted also in a case in which a time is required in accordance with situations of the vehicle 200 side such as fuel filling, charging of a power supply, car washing, and the like.

REFERENCE SIGNS LIST

1 Vehicle information providing system
100, 100-1, 100-2 Terminal device
101 Co-passenger information
110 Information acquiring unit
120 Display
130 Communicator
200 Vehicle
210 External system monitoring device
220 Communication device
230 Navigation device
234 GNSS receiver
234 Receiver
236 Navigation control device
240 Recommended lane determining device
250 Automated driving controller
260 Driving force output device
262 Braking device
264 Steering device
300 Vehicle information providing device
310 Communicator
320 Acquisition unit
330 Plan setting unit
340 Information providing unit 380 Storage unit
382 User information
384 Destination data
386 Vehicle operation information

The invention claimed is:

1. A vehicle information providing device comprising:
an acquisition unit that acquires a destination input by a user; and
a plan setting unit that sets a plan for a vehicle to travel toward the destination acquired by the acquisition unit,
wherein the plan setting unit:
sets a first travel plan for moving a first user to a first destination set as a destination on a first route before a first time;
sets a second travel plan for moving the first user and a second user on a second route which allows the second user to ride by changing the first route in a case in which the second user desires co-riding in the vehicle traveling in accordance with the first travel plan; and
determines whether or not the first user will be able to be moved to the first destination before the first time in a case in which the vehicle travels in accordance with the second travel plan and sets the second travel plan to the travel plan instead of the first travel plan in a case in which it is determined that the first user will be able to be moved to the first destination before the first time in a case in which the vehicle travels in accordance with the second travel plan,
wherein the vehicle information providing device further comprises a communicator that communicates with a plurality of terminal devices,
wherein the plan setting unit causes the communicator to transmit information for inquiring about whether or not permission for co-riding of the second user is accepted to a terminal device used by the first user at the time of setting the second travel plan to the travel plan, and
wherein the plan setting unit sets a fare for the user, discounts the fare for the first user who has permitted co-riding of the second user by a first discount amount, and discounts the fare for the first user who has permitted co-riding of the second user by a second discount amount that is a discount amount larger than the first discount amount that is the discount amount in a case in which the vehicle arrives at the destination before the first time in a case in which it is determined that the first user cannot be moved to the first destination before the first time in a case in which the vehicle travels in accordance with the second travel plan, and the communicator receives information indicating that the first user permits co-riding of the second user.

2. The vehicle information providing device according to claim 1,
wherein, in a case in which the second user desires co-riding, the plan setting unit determines whether or not the first user will be able to be moved to the first destination before the first time in a case in which the vehicle travels in accordance with the second travel plan and causes the communicator to transmit information for inquiring about whether or not permission for co-riding of the second user is accepted to the terminal device used by the first user in a case in which it is determined that the first user will be able to be moved to the first destination before the first time in a case in which the vehicle travels in accordance with the second travel plan.

3. The vehicle information providing device according to claim 1,
wherein, in a case in which the second user desires co-riding, the plan setting unit determines whether or not the first user will be able to be moved to the first destination before the first time in a case in which the vehicle travels in accordance with the second travel plan and causes the communicator to transmit information for inquiring about whether or not permission for co-riding of the second user is accepted to the terminal device used by the first user in a case in which it is determined that the first user cannot be moved to the first destination before the first time in a case in which the vehicle travels in accordance with the second travel plan.

4. The vehicle information providing device according to claim 1, wherein the second travel plan is set to the travel plan instead of the first travel plan in a case in which the communicator receives information indicating that the first user permits co-riding of the second user.

5. The vehicle information providing device according to claim 1, wherein the plan setting unit sets the first travel plan with a desired arrival time at the destination acquired from the first user set as the first time.

6. The vehicle information providing device according to claim 5, wherein the plan setting unit selects a vehicle that is determined to be able to arrive before the desired arrival time among vehicles that can be allocated to the destination acquired by the acquisition unit and sets a travel plan of the selected vehicle.

7. The vehicle information providing device according to claim 1, wherein the plan setting unit discounts the fare for the user in a case in which a time is required for any one of fuel filling, charging of a power supply, and car washing of the vehicle.

8. A vehicle information providing device comprising:
an acquisition unit that acquires a destination input by a user;
a plan setting unit that sets a plan for a vehicle to travel toward the destination acquired by the acquisition unit; and
a communicator that communicates with a plurality of terminal devices,
wherein the plan setting unit:
sets a first travel plan for moving a first user to a first destination set as a destination on a first route before a desired arrival time at the destination acquired from the first user;
sets a second travel plan for moving the first user and a second user on a second route which allows the second user to ride by changing the first route in a case in which the second user desires co-riding in the vehicle traveling in accordance with the first travel plan;
determines whether or not the first user will be able to be moved to the first destination before the desired arrival time in a case in which the vehicle travels in accordance with the second travel plan,
sets the travel plan on the basis of a result of the determination,
causes the communicator to transmit, to a terminal device used by the first user, information that inquires whether or not permission for co-riding of the second user is acceptable, and
sets a fare for the travel plan, discounts the fare for the first user that permitted co-riding of the second user by a first discount amount based on the vehicle arriving at the destination before the desired arrival time in a case in which the vehicle travels in accordance with the second travel plan, and discounts the fare for the first user that permitted co-riding of the second user by a second discount amount based on the vehicle arriving at the destination after the desired arrival time in a case in which the vehicle travels in accordance with the second travel plan, wherein the second discount amount is more than the first discount amount, and wherein the communicator receives information indicating the first user permits co-riding of the second user.

9. A vehicle information providing method using a computer, the method comprising:

acquiring a destination input by a user;

setting a plan for a vehicle to travel toward the acquired destination;

setting a first travel plan for moving a first user to a first destination set as a destination on a first route before a first time;

setting a second travel plan for moving the first user and a second user in a second route which allows the second user to ride by changing the first route in a case in which the second user desires co-riding in the vehicle traveling in accordance with the first travel plan;

determining whether or not the first user will be able to be moved to the first destination before the first time in a case in which the vehicle travels in accordance with the second travel plan and setting the second travel plan to the travel plan instead of the first travel plan in a case in which it is determined that the first user will be able to be moved to the first destination before the first time in a case in which the vehicle travels in accordance with the second travel plan;

communicating, to a terminal device used by the first user, information related to whether or not permission for co-riding of the second user is acceptable;

setting a fare for the travel plan, wherein the setting comprises;

discounting the fare for the first user by a first discount amount based on the vehicle arriving at the destination before the first time in a case in which the vehicle travels in accordance with the second travel plan, and discounting the fare for the first user by a second discount amount based on the vehicle failing to arrive at the destination before the first time in a case in which the vehicle travels in accordance with the second travel plan, wherein the second discount amount is larger than the first discount amount; and receiving, from the terminal device used by the first user, information indicating the first user permits co-riding by the second user.

10. A non-transitory computer-readable storage medium that stores a program causing a computer to execute:

acquiring a destination input by a user;

setting a plan for a vehicle to travel toward the acquired destination;

setting a first travel plan for moving a first user to a first destination set as a destination on a first route before a first time;

setting a second travel plan for moving the first user and a second user in a second route which allows the second user to ride by changing the first route in a case in which the second user desires co-riding in the vehicle traveling in accordance with the first travel plan;

determining whether or not the first user will be able to be moved to the first destination before the first time in a case in which the vehicle travels in accordance with the second travel plan and setting the second travel plan to the travel plan instead of the first travel plan in a case in which it is determined that the first user will be able to be moved to the first destination before the first time in a case in which the vehicle travels in accordance with the second travel plan, setting a fare for the plan, wherein the setting comprises;

discounting the fare for the first user by a first discount amount based on the vehicle arriving at the destination before the first time in a case in which the vehicle travels in accordance with the second travel plan, and discounting the fare for the first user by a second discount amount based on the vehicle failing to arrive at the destination before the first time in a case in which the vehicle travels in accordance with the second travel plan, wherein the second discount amount is larger than the first discount amount; and receiving, in response to an inquiry related to co-riding of the second user, information indicating that the first user permits co-riding by the second user.

11. A vehicle information providing method using a computer, the method comprising:

acquiring a destination input by a user;

setting a plan for a vehicle to travel toward the acquired destination;

setting a first travel plan for moving a first user to a first destination set as a destination on a first route before a desired arrival time at the destination acquired from the first user;

setting a second travel plan for moving the first user and a second user in a second route which allows the second user to ride by changing the first route in a case in which the second user desires co-riding in the vehicle traveling in accordance with the first travel plan;

determining whether or not the first user will be able to be moved to the first destination before the desired arrival time in a case in which the vehicle travels in accordance with the second travel plan;

setting the travel plan on the basis of a result of the determination;

setting a fare for the travel plan;

discounting the fare by a first amount in a case where arrival of the vehicle at the first destination is before the desired arrival time, and by a second amount, larger than the first amount, in a case where arrival of the vehicle at the first destination is after the desired arrival time and based on the first user permitting co-riding of the second user; and receiving information that the first user permits the co-riding of the second user.

12. A non-transitory computer-readable storage medium that stores a program causing a computer to execute:

acquiring a destination input by a user;

setting a plan for a vehicle to travel toward the acquired destination;

setting a first travel plan for moving a first user to a first destination set as a destination on a first route before a desired arrival time at the destination acquired from the first user;

setting a second travel plan for moving the first user and a second user in a second route which allows the second user to ride by changing the first route in a case in which the second user desires co-riding in the vehicle traveling in accordance with the first travel plan;

determining whether or not the first user will be able to be moved to the first destination before the desired arrival time in a case in which the vehicle travels in accordance with the second travel plan;

setting the travel plan on the basis of a result of the determination, setting a fare for the plan;

discounting the fare by a first amount in a case where arrival of the vehicle at the first destination is before the desired arrival time based on the first user permitting co-riding of the second user;

discounting the fare by a second amount, larger than the first amount, in a case where arrival of the vehicle at the first destination is after the desired arrival time based on the first user permitting co-riding of the second user; and receiving information that the first user permits the co-riding of the second user.

* * * * *